(No Model.)

H. LINDESTROM.
WHEELED PLOW.

No. 525,424.  Patented Sept. 4, 1894.

Witnesses:
L. A. Clark.
E. Behel.

Inventor:
Hjalmar Lindestrom
By A. O. Behel
Atty

UNITED STATES PATENT OFFICE.

HJALMAR LINDESTROM, OF DE KALB, ILLINOIS.

WHEELED PLOW.

SPECIFICATION forming part of Letters Patent No. 525,424, dated September 4, 1894.

Application filed February 23, 1894. Serial No. 501,102. (No model.)

*To all whom it may concern:*

Be it known that I, HJALMAR LINDESTROM, a citizen of the United States, residing at De Kalb, in the county of De Kalb and State of Illinois, have invented certain new and useful Improvements in Wheeled Plows, of which the following is a specification.

The object of this invention is to pivot a beam upon the axle of the plow to the front end of which is connected a clevis to which the team is attached, this beam supporting the plow and colter.

The further object of this invention is to hold the caster wheel in proper position by a spring actuated dog, which permits the caster wheel to turn upon its pivot when the friction mechanism is overcome.

Figure 1:
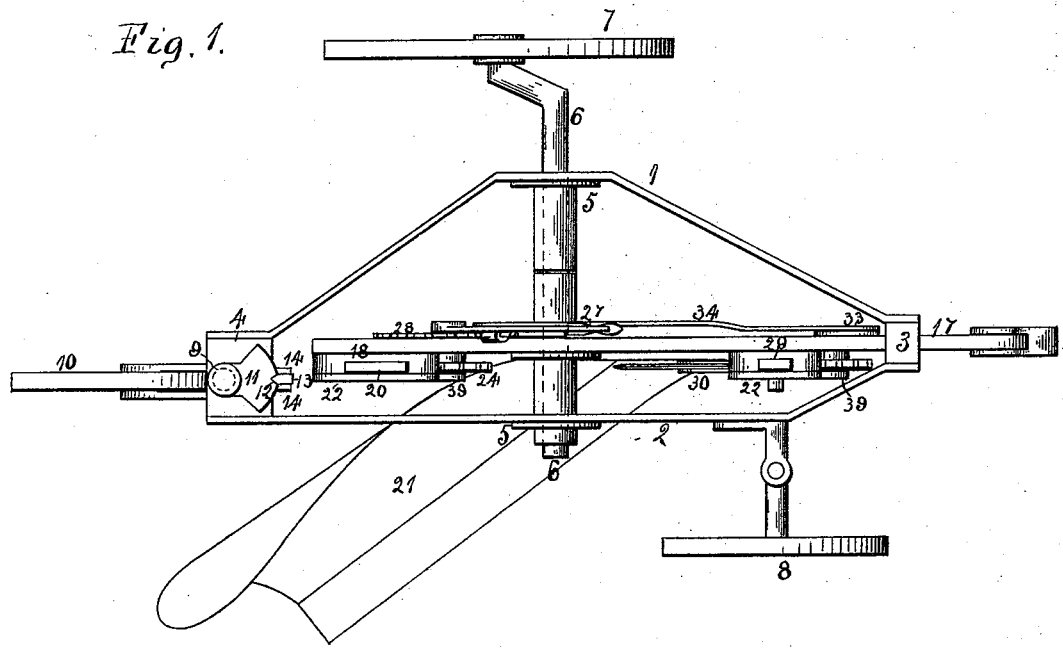
Figure 2:
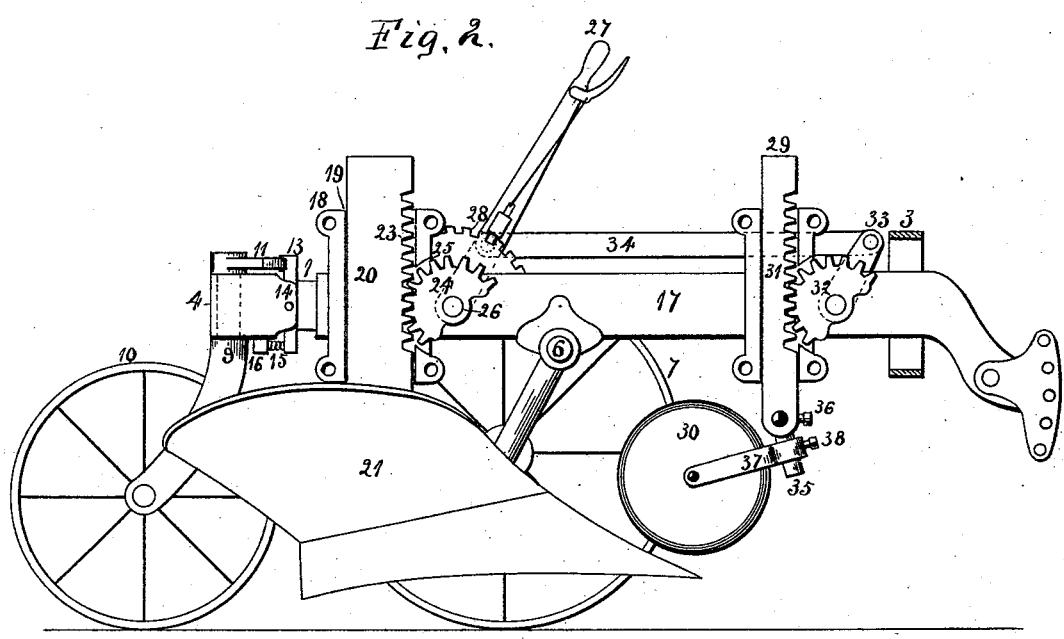

In the accompanying drawings, Figure 1, is a plan view of a plow embodying my invention. Fig. 2, is a side elevation of the same in which the furrow wheel at one side of the supporting frame has been removed.

The main supporting frame consists of the side bars 1, and 2 their front end having a connection with a vertically slotted guide 3, and their rear ends held separated by a block 4. About the center of the length of these guide bars are secured brackets 5, having a central hub extending therefrom, and within these brackets is located a bracket 6, to one end of which is connected an ordinary land wheel 7, and to the outside of one of the side bars is connected a furrow wheel 8, in any proper manner.

The block 4, is provided with a vertical opening within which is seated the upper end of the yoke 9, of the caster wheel 10, thereby forming a connection between the caster wheel and supporting frame. To the upper end of the shank of the caster wheel yoke is secured a segment 11, provided with a notch 12, in its periphery and a dog 13, is located between ears 14, extending from the block and has a pivotal connection therewith, its upper end located within the notch of the segment 11, a spring 15, is located between the lower end of the dog and a projection 16, extending from the under face of the block. By this arrangement the caster wheel is held in the line of draft of the machine when the plow is in working position, but upon turning the plow the side pressure brought to bear upon the caster wheel will force the spring actuated dog out of the notch of the segment, and upon the plow, again assuming its working position, the caster wheel will be brought in the line of draft and so held by the spring actuated dog.

To the beam 17, having a pivotal connection with the axle-tree and near its end is secured a bracket 18, provided with a vertical groove 19, within which is located the standard 20, of the plow 21, and a cap 22, holds the plow standard within the groove, the front end of the standard is provided with teeth 23, forming a rack. The toothed segment 24, has a pivotal connection with the beam, the teeth of which pass through an opening 25, in the front edge of the bracket 18. A shaft 26, having a connection with the toothed segment passes through the beam 17, and having a hand lever 27, connected to its projecting end. This hand lever is provided with the usual thumb lever and toothed segment 28, for holding the lever when adjusted. By means of this connection the plow is raised and lowered bodily and can be held at any required adjustment. To this beam 17, near its front end but within the main supporting frame of the machine is located a support 29, for the colter 30, having its front face provided with teeth 31, a toothed segment 32, has a pivotal connection with the beam 17, and to its pivotal shaft on the opposite side of the beam is secured a lever 33, and a link 34, has a pivotal connection with this lever at one end and with the hand lever at its opposite end thereby forming a connection between the hand lever and the colter support.

To the lower end of the colter support 29, is adjustably secured a right angle bar 35, by means of a set screw 36, and to the lower or vertical portion of the right angle bar 35, is adjustably secured the yoke 37, of the colter by the set screw 38. The caps 22, which hold the plow standard, and the colter support in position are provided with an extension 39, which receives the pivot upon which the toothed segments move. By this arrangement a connection is formed between the plow standard and the colter support so that they are raised and lowered in unison, and hold their relative positions with each other and both operated by the same hand lever.

It will be noticed that the front end of the beam 17, to which the team is attached has a limited vertical movement upon its axle support with the main frame, the plow in its working action being substantially independent of its supporting frame.

I claim as my invention—

1. In a wheeled plow the combination of a main frame, composed of two lengthwise bars, an axle supported by the bars and supporting a land wheel, a plow beam located within the frame, a plow supported thereby, the frame having its front portion made with a vertical elongated opening within which is located the forward end of the plow beam in order that a limited vertical movement may be allowed the plow beam.

2. In a wheeled plow the combination of a main frame, composed of two lengthwise bars, an axle supported by the bars, a plow beam having a connection with the axle, a bracket secured to the plow beam rearward of the axle, a bracket secured to the plow beam forward of the axle, each having a recessed face, a plow standard located in the recess of the rear bracket and a colter standard located in the recess of the forward bracket, one edge of each provided in toothed rack form, and held in place by suitable plates, a toothed segment meshing with the teeth of the plow standard, a toothed segment meshing with the teeth of the colter standard both supported by the plow beam, a toothed quadrant having a connection with the plow beam on the opposite side to the plow standard, a hand lever having a connection with the toothed segment of the plow standard, and engaging the toothed quadrant, an arm having a connection with the toothed segment of the colter standard, and a link connecting this arm with the hand lever, whereby the plow standard and colter standard are raised or lowered simultaneously and held at any desired point.

3. In a wheeled plow the combination of a supporting frame a caster wheel; its shank having a pivotal connection with the frame, a lever having a connection with the upper end of the shank, a spring actuated lever having a pivotal connection with the frame, and an engagement with the lever of the shank, whereby the caster wheel is held in the line of draft by spring force.

HJALMAR LINDESTROM.

Witnesses:
A. O. BEHEL,
E. BEHEL.